United States Patent [19]
Vaught

[11] Patent Number: 5,224,690
[45] Date of Patent: Jul. 6, 1993

[54] WORK HOLDER FOR HONEYCOMB STRUCTURE

[76] Inventor: James V. Vaught, Rte. 3, Box 187, Tallassee, Ala. 36078

[21] Appl. No.: 894,833

[22] Filed: Jun. 8, 1992

Related U.S. Application Data

[63] Continuation-in-part of Ser. No. 698,960, May 13, 1991, Pat. No. 5,131,637.

[51] Int. Cl.⁵ .............................................. B23Q 3/00
[52] U.S. Cl. .................................................. 269/48.3
[58] Field of Search .................... 269/48.1, 48.2, 48.3, 269/48.4, 47, 50, 52, 53, 54.1, 54.5, 900, 309, 310; 279/2 R

[56] References Cited

U.S. PATENT DOCUMENTS

| | | | |
|---|---|---|---|
| 2,952,282 | 9/1960 | McHenry | 269/47 |
| 3,565,416 | 2/1971 | Williamson et al. | 269/47 |
| 4,688,974 | 8/1987 | Wright et al. | 269/48.1 |
| 4,914,798 | 4/1990 | Gentile | 269/48.1 |
| 4,916,792 | 4/1990 | Haubus | 269/48.1 |

*Primary Examiner*—Robert C. Watson
*Attorney, Agent, or Firm*—Veal & Associates

[57] ABSTRACT

A work holder for honeycomb structures utilizing a set of expandable fingers mounted on an engagement plate for insertion into the cells of a honeycomb structure such that a stripper plate carrying a plurality of pins aligned with said fingers may be brought into abutment with the engagement plate to seat the pins within the fingers thereby urging the fingers into secure gripping contact with the walls of the honeycomb cells to secure the structure during machining thereof.

15 Claims, 4 Drawing Sheets

WORK HOLDER FOR HONEYCOMB STRUCTURE

This is a continuation-in-part of application Ser. No. 07/698,960, filed May 13, 1991 now U.S. Pat. No. 5,131,637.

FIELD OF THE INVENTION

The present invention relates generally to machine tools and more specifically to work holders which hold an article to be machined by a tool. In greater particularity the present invention relates to a work holder which can position a section of honeycomb material and hold such material while the material is shaped or formed in a machined configuration.

BACKGROUND OF THE INVENTION

Honeycomb materials made from fiberglass, metals, kraft paper and other materials are used in a variety of applications including personal shelters, electronic enclosures, intermodal cargo containers, radomes, aircraft structural parts and fairings, and heat shields. Such honeycomb materials come in a variety of cell configurations and dimensions including hexagonal cells, square cells and non-linear cells. In all honeycomb structures known to me the cells are connected by interstitial walls and form a linear array or matrix of columns and rows. While the obvious weight and strength ratios of honeycomb materials make such materials highly desirable in the aforementioned and other applications, the use of honeycomb material is not without its problems. A primary difficulty has been encountered in holding honeycomb material while it is being machined into various shapes. Heretofore, honeycomb materials have been held to the work surface of a machine tool by freezing water within the cells and machining the frozen honeycomb to the desired shape. Obviously, this method is quite messy; however, it is the only means known to me for performing this task.

SUMMARY OF THE INVENTION

It is the principal object of my invention to provide a piece holder for honeycomb materials that can easily and effectively hold the material in position on a work surface for machining by a machine tool.

In furtherance of the primary object, it is the object of this invention to hold honeycomb material in position without distorting the cells thereof.

It is yet another object of the invention to provide a work holder for honeycomb material which does not interfere with the machine tool in any manner.

These and other objects and features of my invention are advantageously accomplished through the use of internal gripping means for engaging the cell walls at selected locations within the honeycomb structure. More specifically the gripping means is a plurality of expandable fingers which are insertable within the cells of the structure and selectively radially urged into engagement with the cell walls to hold the honeycomb while it is being machined.

BRIEF DESCRIPTION OF THE DRAWINGS

Apparatus embodying features of my invention are depicted in the accompanying drawings which form a portion of this disclosure and wherein.

DESCRIPTION OF THE PREFERRED EMBODIMENT

Figure 1:
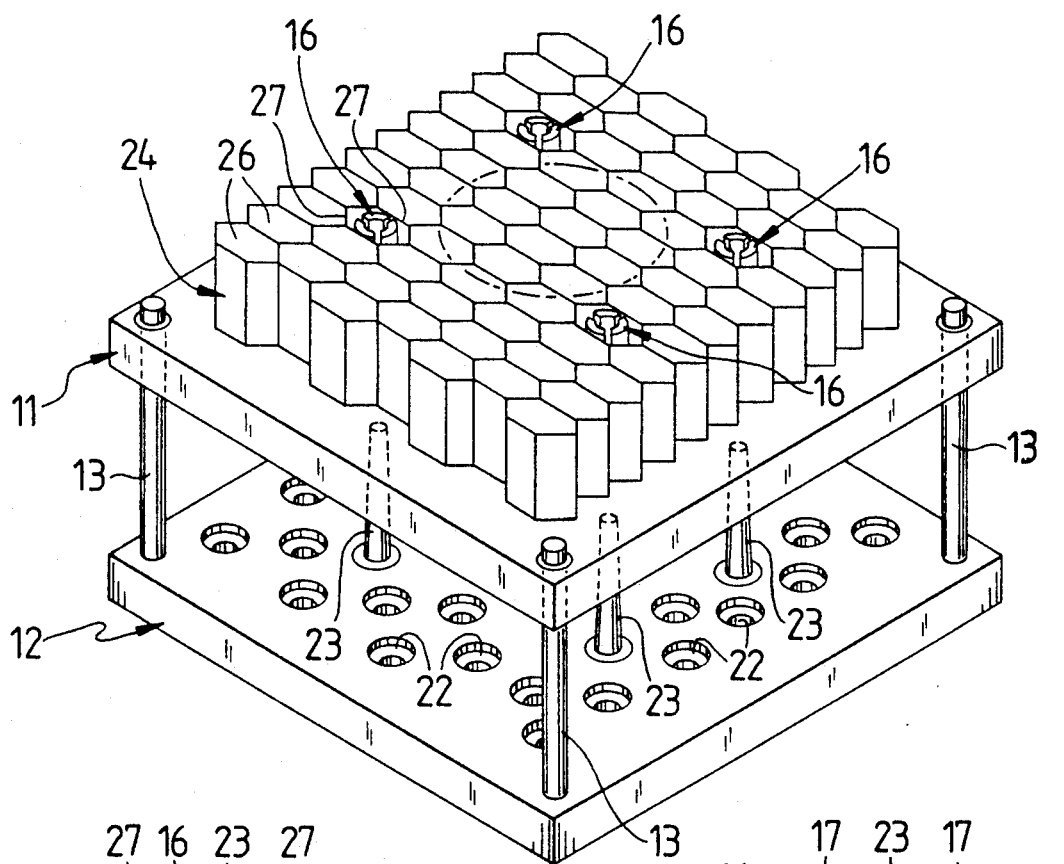
FIG. 1 is a perspective view of my invention supporting a block of honeycomb material.
Figure 2:
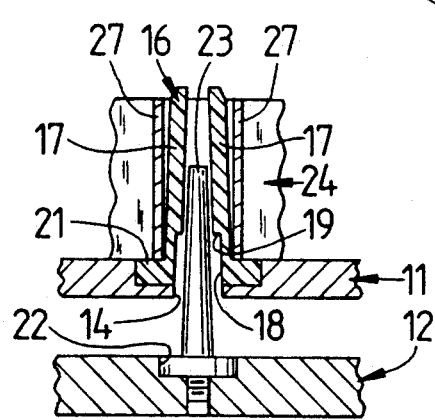
FIG. 2 is a sectional view taken perpendicular to a pin and finger of my invention showing the finger internally of a cell in a non-wall engaging position.
Figure 3:
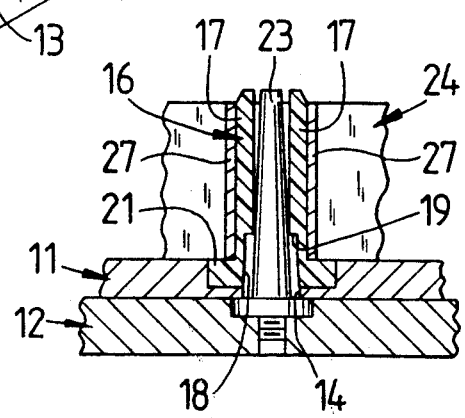
FIG. 3 is a sectional view as in FIG. 2 showing the finger urged into wall engagement by the pin.
Figure 4:
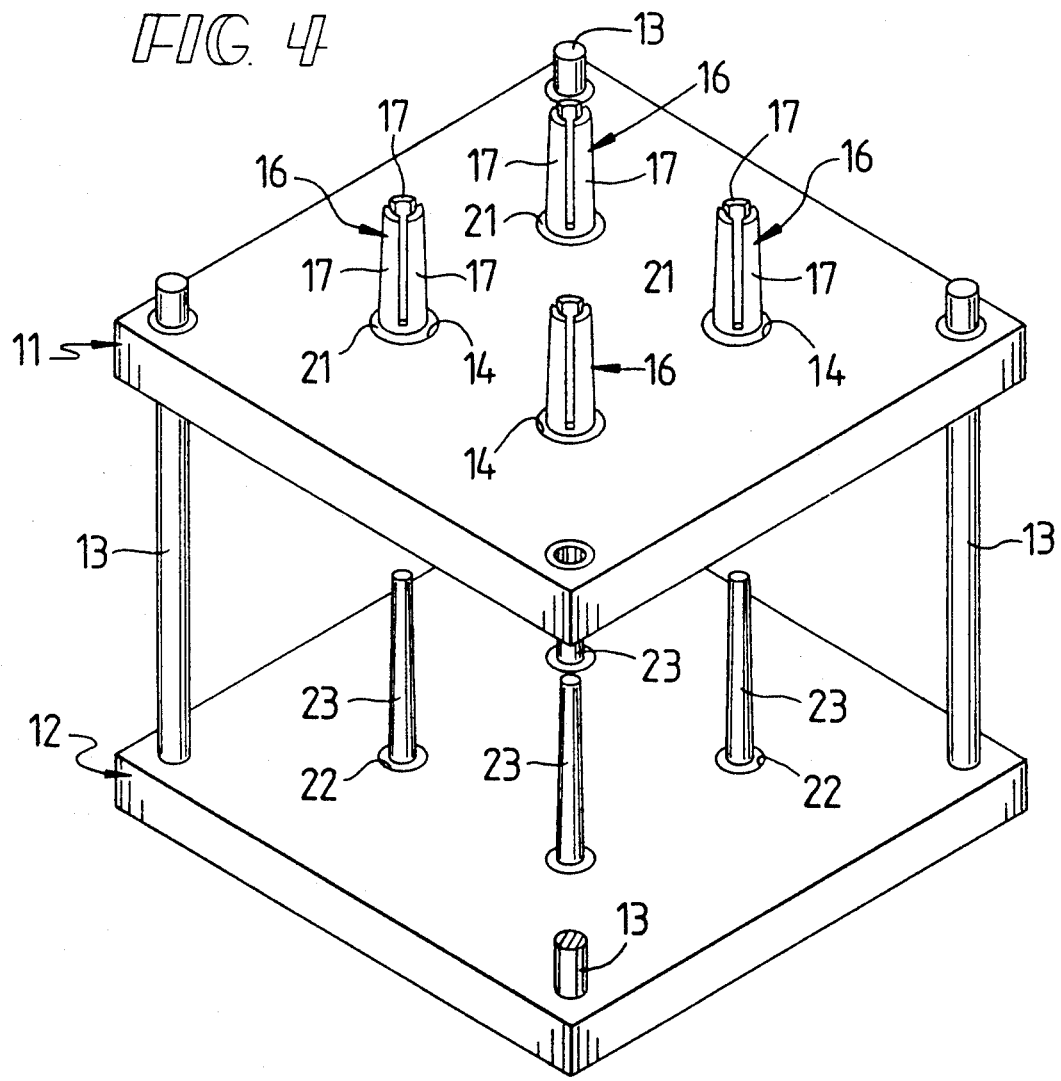
FIG. 4 is a perspective view of a second embodiment of my invention.

Referring to the figures for a clearer understanding of my invention it may be seen in FIG. 1 that my invention uses an upper engagement plate 11 and a lower stripper plate 12. A plurality of guide rods 13 are provided at the corners of the plates 11 and 12 to maintain alignment of the plates at all vertical separations thereof. In one embodiment my engagement plate has a plurality of expansion fingers 16 as shown in FIGS. 2 and 3. In this embodiment the expansion fingers 16 may be selectively positioned at any location on the plate 11 defined by a mounting orifice 14. In a second embodiment shown in FIG. 4 the expansion fingers 16 are mounted at specific locations on the plate 11.

In either embodiment it should be noted that the expansion fingers 16 are defined by a plurality of elongated segments 17 integrally formed for flexing about an axial opening which has an enlarged diameter 18 proximal plate 11. The enlarged diameter may be defined by an internal shoulder 19 such that the portion of the segments 17 have a reduced thickness near the plate 11. An annular base 21 circumscribes the enlarged diameter and provides structural connection between the otherwise unconnected segments 17. The base 21 may be threaded into a portion of mounting orifice 14 or may be otherwise detachably and reattachably connected therein. Orifice 14 may have an enlarged portion for receiving the annular base 21.

As may be seen in FIGS. 1–3, in the first embodiment the stripper plate 12 has a plurality of receptacles 22 formed therein for detachably and reattachably affixing a plurality of pins 23 which are aligned with the fingers 16. In the second embodiment, shown in FIG. 4 these pins are positioned in fixed alignment with the fingers 16. Each pin 23 includes an upper shaft-like portion which is insertable within the axial opening of the finger 16 and has a diameter sufficient to urge the elongated segments 17 radially outwardly upon insertion into said opening. Inasmuch as a uniform spreading of the segments 17 is desired the pin 23 may be slightly tapered to allow complete insertion into the opening. The enlarged diameter region 18 of the finger 16 increases flexibility and also prevents premature binding of the pin in this region. Fingers 16 are preferably made from a plastic or rubber-like material such that the exterior therein has good adherence to the wall of a honeycomb structure such as shown at 24. The pins 23 are made of a rigid material, preferably teflon or aluminum, which is easily insertable within the opening without creating a large component of vertical force. The fingers may also include a threaded base portion for affixation in the receptacle 22.

In operation the honeycomb structure 24 is placed on the engagement plate 11 as shown in FIGS. 1 and 2 such that the expansion fingers 16 are each loosely received within a cell 26 defined by the interstitial walls 27 of the structure 24. It will be appreciated by those familiar with the art that the cell shape and size varies with the honeycomb structure and its usages. Nonetheless a plurality of cells in a regular array are found in the structure. The engagement plate 11 with the structure and the stripper plate 12 are then brought into abutment such that the pins 23 are fully seated within the axial opening and the segments 17 are urged against the cell walls 27. Obviously the elongated segments 17 should be configured to assure maximum surface area contact with the cell wall 27 when they are urged radially by the pins 23. The fingers 16 and pins 23 are located so as to provide adequate holding force on the structure 24 and due to their mode of engagement may be machined with the honeycomb 24 if such is necessary. It is, of course, preferable to locate the pins 23 and fingers 17 for insertion into cells which require little or no machining. As may be seen in FIG. 6, the pins 23 and fingers 16 are located in a portion of the structure 24 outside of the circular area which has been recommended by machining.

Figure 6:
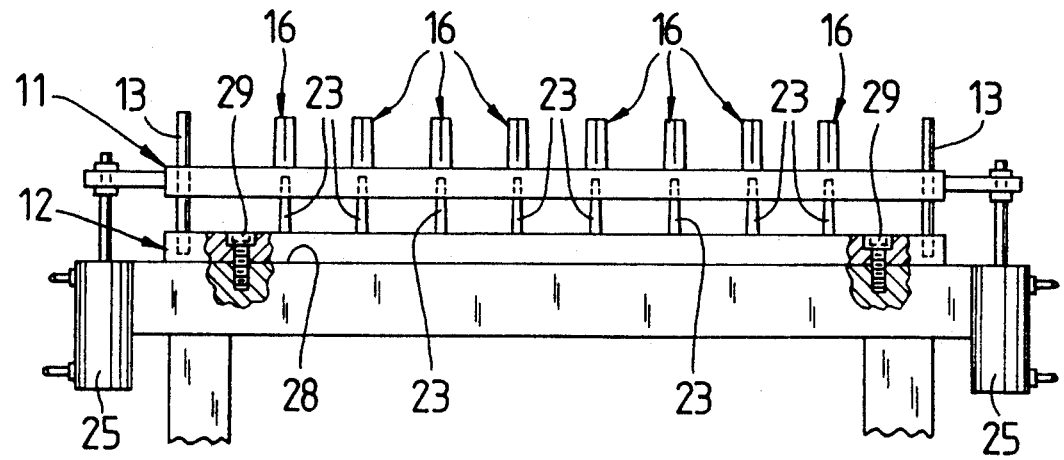
FIG. 6 is a side elevational view of a third embodiment of my invention.
Figure 5:
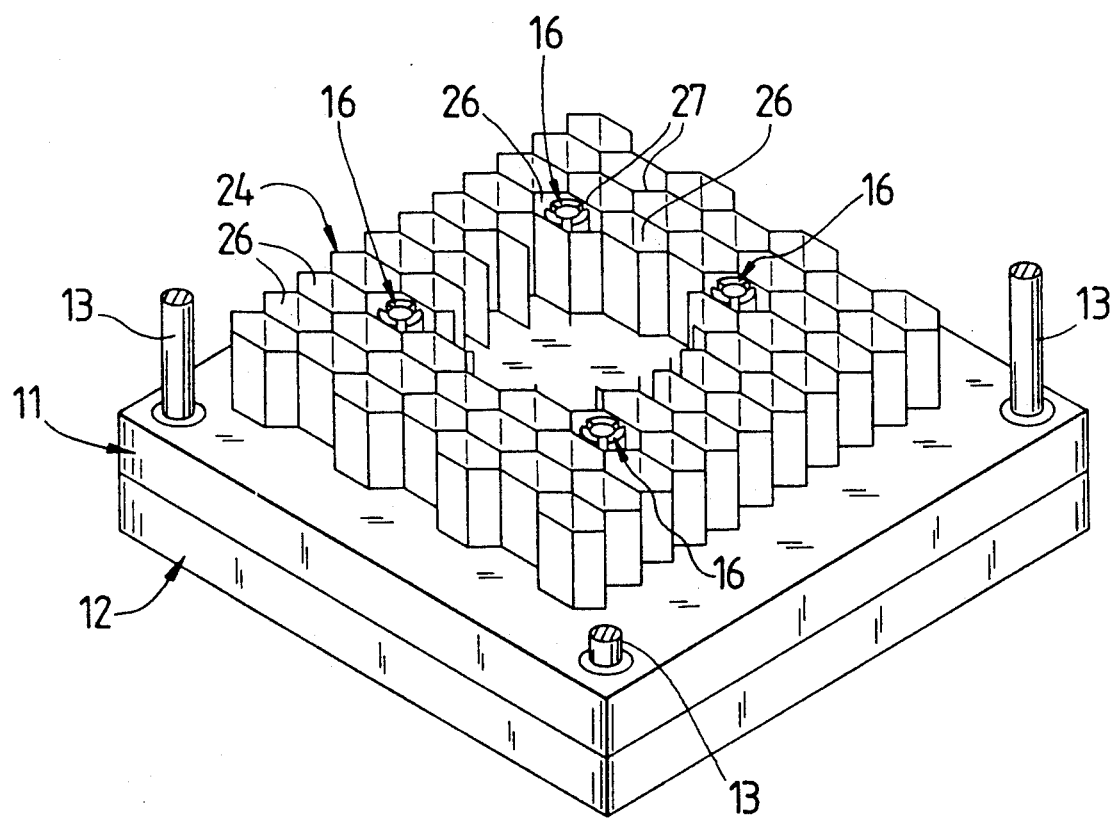
FIG. 5 is a perspective view of my invention supporting a machined block of honeycomb material.

It will also be appreciated that although the plates 11 and 12 may be brought into abutment and separated manually, various devices may be employed to mechanically move one or the other plate. In FIG. 6, I have provided a set of linear actuators 25 which move plate 11 along guides 13 to engage and disengage the pins and fingers. Plate 12 is affixed to the work surface 28 of a machine tool in a conventional manner by bolts 29.

Figure 7:
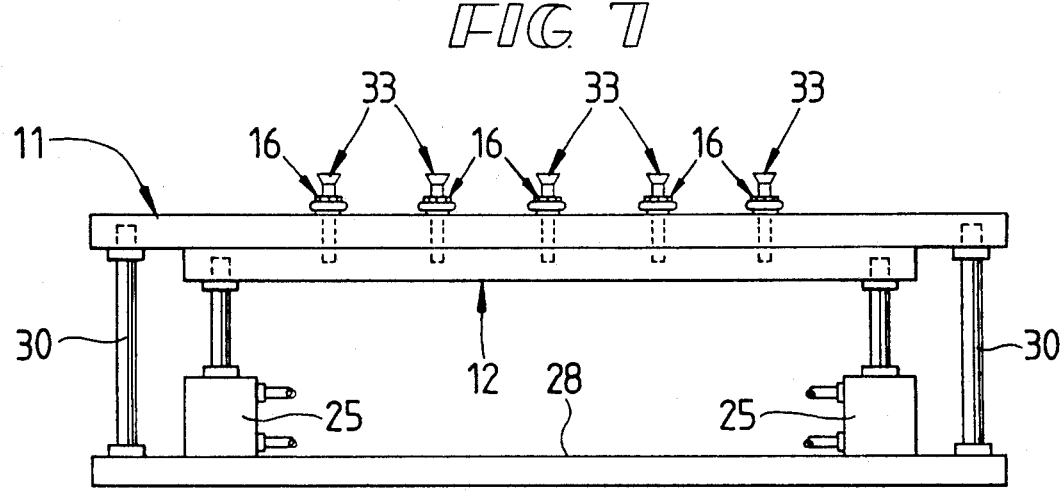
FIG. 7 is a side elevational view of a fourth embodiment of my invention.
Figure 10:
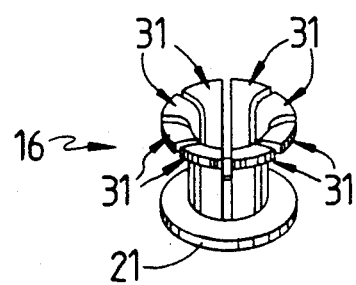
FIG. 10 is an enlarged perspective view of an expansion finger used in a fourth embodiment of the present invention.
Figure 8:
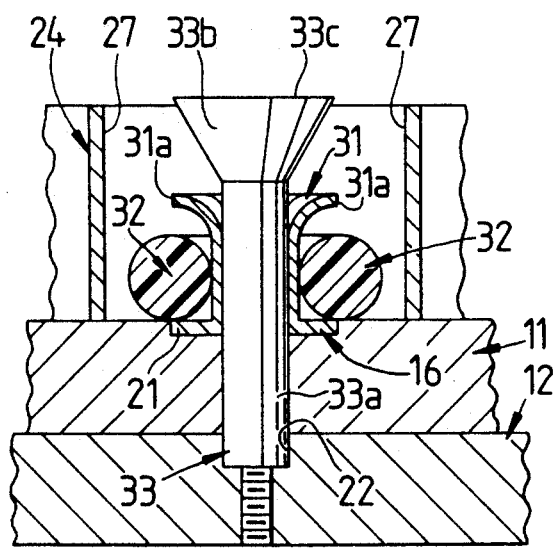
FIG. 8 is a detailed sectional view of a fourth embodiment of the present invention in a lowered position.
Figure 9:
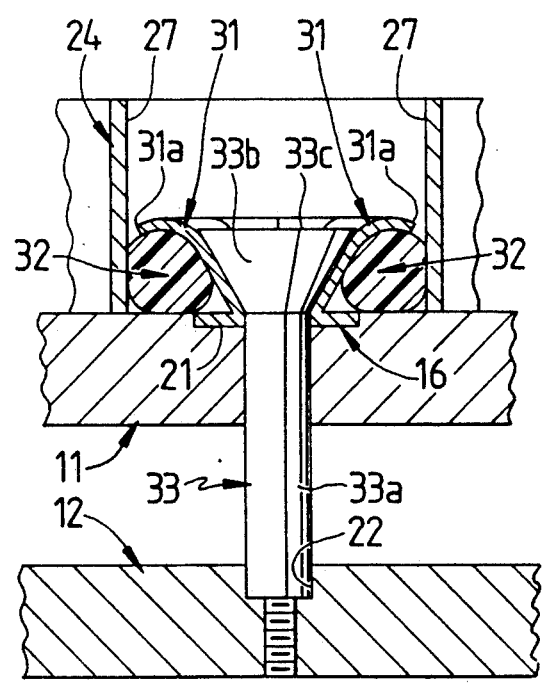
FIG. 9 is a detailed sectional view of a fourth embodiment of the present invention in a raised position.

FIG. 7 shows a fourth embodiment of the present invention having an upper engagement plate 11 and lower stripper plate 12 similar to those previously described The upper engagement plate 11 is mounted to a fixed work surface 28 and supported a distance thereabove by rods 30. Linear actuators 25 are provided to move the lower stripper plate 12 relative to the upper engagement plate 11. As shown in FIGS. 8-10, the expansion fingers 16 each include a plurality of semiflexible elastic segments 31 integrally connected to the annular base 21 and extending upwardly then radially outward therefrom. As shown in FIG. 8, an annular, elastic member 32 encircles the segments 31 and is secured to the upper engagement plate 11 by an outwardly extending lip portion 31a thereof In place of the pins 23, biasing members 33 are seated with receptacles 22 and extend upwardly therefrom through the annular base 21 and inwardly of the segments 31. The biasing members 33 each include a cylindrical elongated portion 33a seated within the receptacle 22 and received within the annular base 21. The biasing members 33 further include a frusto-conical cam 33b integrally formed on to an upper end of the elongated portion 33a and flaring upwardly and outwardly therefrom to define an enlarged diameter upper surface 33c.

In operation, the linear actuators 25 are operated to raise the lower stripper plate 11 in contact with the upper engagement plate 11. FIG. 8 shows the lower stripper plate 12 in the raised position. When the lower stripper plate 12 is in the raised position, the segments 31 extend substantially vertically along the elongated portion 33a. The elastic member 32 is relaxed to permit reception of the elastic members 32 within cells 26 when the honeycombed structure 24 is placed on the upper engagement plate 11. To engage the structure the lower stripper plate 12 is lowered from the upper engagement plate 11 as is shown in FIG. 9. The downward movement of the lower stripper plate 12 urges the cam 33b against the segments 31 which are urged outwardly and downwardly relative to the elastic member 33. The movement of the segments 31 against the elastic member 32 urges the elastic member 32 against the interstitial walls 27 to secure the honeycombed structure 24 to the upper engagement plate 11. The segments 31 are particularly effective in expanding the elastic members 32 because the segments move both outwardly and downwardly to both expand and compress the elastic member 32. The downward movement of the segments 31 in combination with the radial configuration of the lip portions 31a results in a significant compression force that is partially exerted against the walls 27 through the increased expansion of the elastic member 32.

From the foregoing it may be seen that I have devised an apparatus that can hold a honeycomb structure securely atop a work station such that a machine tool may perform any desired operation on the structure to smooth, contour or cut the structure as desired. Further the gripping elements or fingers and pins may be appropriately sized for any type honeycomb cell structure thereby providing a holder of wide application.

While I have shown my invention in several forms, it will be obvious to those skilled in the art that it is not so limited but is susceptible of various changes and modifications without departing from the spirit thereof.

What I claim is:

1. Apparatus for securing a honeycombed member having a plurality of interconnected wall members defining a plurality of adjacent open cells comprising on combination:

(a) expandable engagement means for insertion in selected cells of a honeycomb structure, wherein said expandable engagement means includes a plurality of elongated expansion fingers with each expansion finger having an axial opening therethrough and divided into a plurality of elongated segments, wherein each expansion finger is integrally formed with an annular base member having a central aperture aligned with said axial opening with said base being affixed to each of said elongated segments, wherein an annular elastic member is circumscribed about one of said plurality of expansion fingers;

(b) means for holding said expandable engagement means in a predetermined arrangement; and (c) means for selectively urging said expandable engagement means into abutment against cell defining walls within said honeycomb structure.

2. Apparatus as defined in claim 1 wherein said segments extend upwardly from said annular base then diverge radially outward above said elastic member.

3. Apparatus as defined in claim 1 wherein said urging means comprises a plurality of biasing members each having an elongated portion extending through said annular base and said axial opening and a frusto-conical cam integrally formed at an upper end of said elongated portion and adapted for urging said elastic member radially outward and against said wall members.

4. Apparatus as defined in claim 3 wherein said holding means comprises a first plate-like member having a plurality of orifices therethrough, wherein each said annular base is received within a selected one of said plurality of orifices in detachably secured engagement therein.

5. Apparatus as defined in claim 4 further comprising a second plate-like member detachably connected to said plurality of biasing members subjacent to said first plate-like member, wherein said plurality of biasing members extend upwardly from said second plate-like member through said orifices, said central apertures and said axial openings, such that movement of said first plate-like member from said second plate-like member will urge said segments against said cams and outwardly and downwardly against said elastic members thus urging said elastic members against said walls.

6. Apparatus as defined in claim 1 wherein said urging means comprises a plurality of biasing members each having an elongated portion, extending through one of said plurality of elastic members, and a frusto conical cam integrally formed at an upper end of said elongated portion and adapted for urging said elastic member radially outward and against said wall members.

7. Apparatus as defined in cl aim 1 wherein said means for holding comprises a substantially plate-like member having a plurality of mounting orifices formed therein for selective mounting therein of said annular bases in alignment with selected cells of said honeycomb structure.

8. Apparatus as defined in claim 1 wherein said means for holding comprises a plate-like member affixed to said elongated fingers and having an aperture therethrough aligned with the central opening of each finger.

9. Apparatus as defined in claim 1 wherein said annular elastic members expand radially to engage said walls of said honeycomb without deforming said walls.

10. Apparatus for holding a honeycomb material in position during machining thereof comprising:
(a) means insertable within selected cells of said honeycomb material for selectively engaging interstitial walls defining said cells wherein said engaging means includes an engagement plate having a plurality of engagement fingers attached thereto said engagement fingers having a plurality of elongated segments surrounding an axial opening and being individually radially flexible relative thereto, with each engagement finger being adapted for insertion within a cell, said engaging means further including a plurality of annular elastic members each encircling one of said engagement fingers; and
(b) means associated with said engaging means for urging said engaging means into engagement with said interstitial walls.

11. Apparatus as defined in claim 10 wherein said engagement fingers are detachably and reattachably affixed to said engagement plate for selective positioning thereon to engage selected cells.

12. Apparatus as defined in claim 10 wherein said segments are integrally connected to an annular base detachably connected to said engagement plate and extend upwardly therefrom through said annular elastic member and then diverge radially outwardly thereover.

13. Apparatus as described in claim 10 wherein said means for urging comprises:
(a) a plurality of biasing members, each extending through one of said plurality of engagement fingers and flaring over said segments while extending through one of a plurality of orifices defined in said engagement plate in coaxial relation to said axial openings;
(b) a stripper plate connected to a lower end of each of said plurality of biasing members and connected to and supported by a stationary work surface below said engagement plate, such that upward movement of said engagement plate will urge said segments against said biasing means and bend said segments outwardly against said elastic member to urge said elastic member against said walls.

14. Apparatus as described in claim 13 wherein each said biasing member comprises:
(a) a vertically extending, elongated portion connected to said stripper plate and extending therefrom through one of said plurality of orifices and one of said plurality of axial openings; and
(b) a frusto-conical cam integrally connected to an upper end of said elongated portion and flaring upwardly and outwardly therefrom.

15. Apparatus as defined in claim 14 wherein said segments are integrally connected to an annular base detachably connected to said engagement plate and extend upwardly therefrom through said annular elastic member and then diverge radially outwardly thereover, such that said segments, when moved upwardly relative to said elongated portion, will contact said frusto-conical cam and bend outwardly thereon to urge said annular elastic member against said walls, wherein said segments upon contacting said cam, are urged downwardly relative to said annular base to compress said elastic member against said engagement plate and thereby apply additional force against said elastic member to further urge said elastic member in securing contact with said walls.

* * * * *